(12) United States Patent
Bhadra

(10) Patent No.: US 7,865,408 B2
(45) Date of Patent: *Jan. 4, 2011

(54) SYSTEMS AND ASSOCIATED METHODS FOR WIRELESS SERVICES FOR PACKAGE TRACKING DURING DELIVERY

(75) Inventor: Sourav Bhadra, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 882 days.

This patent is subject to a terminal disclaimer.

(21) Appl. No.: 11/758,190

(22) Filed: Jun. 5, 2007

(65) Prior Publication Data

US 2007/0228143 A1     Oct. 4, 2007

Related U.S. Application Data

(63) Continuation of application No. 09/962,422, filed on Sep. 24, 2001, now Pat. No. 7,243,080.

(60) Provisional application No. 60/235,267, filed on Sep. 25, 2000.

(51) Int. Cl.
   *G06Q 10/00*  (2006.01)
   *G06G 1/14*   (2006.01)

(52) U.S. Cl. .......................... 705/28; 705/22
(58) Field of Classification Search ................. None
   See application file for complete search history.

(56) References Cited

U.S. PATENT DOCUMENTS

| | | | | |
|---|---|---|---|---|
| 5,222,018 A | * | 6/1993 | Sharpe et al. | 705/30 |
| 5,631,827 A | * | 5/1997 | Nicholls et al. | 705/28 |
| 5,638,519 A | * | 6/1997 | Haluska | 705/28 |
| 6,047,264 A | * | 4/2000 | Fisher et al. | 705/26 |
| 6,401,111 B1 | * | 6/2002 | Dan et al. | 709/204 |
| 6,463,420 B1 | * | 10/2002 | Guidice et al. | 705/28 |
| 7,035,856 B1 | * | 4/2006 | Morimoto | 707/10 |
| 2002/0032623 A1 | * | 3/2002 | Wheeler et al. | 705/28 |
| 2002/0057678 A1 | * | 5/2002 | Jiang et al. | 370/353 |
| 2002/0073042 A1 | * | 6/2002 | Maritzen et al. | 705/64 |
| 2003/0195843 A1 | * | 10/2003 | Matsuda et al. | 705/39 |

FOREIGN PATENT DOCUMENTS

| | | |
|---|---|---|
| JP | 10-241059 | 9/1998 |
| JP | 11-110608 | 4/1999 |

(Continued)

OTHER PUBLICATIONS

Grigonis, Richard Zippy, IP voice/fax gateway; a buyer's guide. (Buyers Guide), May 1998, V16, n5, Ps22(11).*

(Continued)

*Primary Examiner*—F. Zeender
*Assistant Examiner*—Mussa Shaawat
(74) *Attorney, Agent, or Firm*—Alston & Bird LLP

(57) ABSTRACT

The present invention provides systems and methods that allow a user to track packages throughout the course of delivery without requiring the user to completely reenter tracking information such as an 18 character tracking number and also allow the user to use a wide variety of communication devices to track and retrack a package without requiring the user to reenter the entire tracking number.

20 Claims, 7 Drawing Sheets

FOREIGN PATENT DOCUMENTS

| | | |
|---|---|---|
| JP | 11-139540 | 5/1999 |
| JP | 2000-242721 | 9/2000 |
| JP | 2002-531307 | 9/2002 |
| WO | WO 96/38800 | 11/1996 |
| WO | WO 96/38800 | * 12/1996 |

OTHER PUBLICATIONS

Hideki Kawamata, Innovative Opportunity in Basic System, pp. 98 to 105, No. 445, Jun. 8, 1998, Nikkei Business Publications, Inc., Relevant portions from pp. 99 & 102.

Richard Zippy Grigonis, IP Voice/Fax Gateways, Buyers Guide, May 1998, vol. 16, No. 5, Ps22(11), 16 Pages, Teleconnect.

* cited by examiner

US 7,865,408 B2

SYSTEMS AND ASSOCIATED METHODS FOR WIRELESS SERVICES FOR PACKAGE TRACKING DURING DELIVERY

CROSS-REFERENCE TO RELATED APPLICATIONS

This application is a continuation of U.S. application Ser. No. 09/962,422 filed Sep. 24, 2001 entitled *Systems and Associated Methods for Wireless Services for Package Tracking During Delivery*, which is hereby incorporated herein in its entirety by reference, and which claims benefit of U.S. Provisional Patent Application No. 60/235,267 filed on Sep. 25, 2000, titled "Systems and Associated Methods for Wireless Services for Package Delivery."

FIELD OF THE INVENTION

The present invention relates generally to tracking packages during delivery, and more particularly, to systems and associated methods for allowing users to readily track packages using a variety of communication devices including wireless devices.

BACKGROUND OF THE INVENTION

In the field of package shipping, packages are routed from origins to destinations throughout the world according to destination addresses typed on shipping labels applied to the packages. Typically, package delivery companies apply a label bearing a machine-readable code to each package in the system to identify the package so that it may be readily tracked as it moves throughout the package distribution system.

Often, information about a package's location is provided to a customer by the delivery company through a variety of different mechanisms so that a customer may easily periodically check on the status of a package. For instance, the customer (or "user" of a package tracking system) may check a delivery company's tracking system from his personal computer by accessing an Internet web site. Alternatively, the customer may check the tracking system while he is in transit using mobile communication devices. Often, customers make many checks to determine package location throughout the overall delivery process.

With the proliferation of a myriad of communication devices, more and more customers want to track packages using more than just the traditional mechanisms such as interactive voice response systems or connecting to Internet based tracking sites using a desktop computer. At the same time, these customers also want the same ease of use for multiple alternative communication devices in checking package location. For instance, a customer might want to use a personal computer and Internet site while at home or in the office sitting at his desk, but then want to use a mobile device such as a cell phone, personal digital assistant or pager while he is in transit. Especially with the advance in wireless technologies, customer demand has drastically increased for the ability to track packages using a mobile communication device with at least the same ease had at home or in the office sitting in front of a computer. However, many of today's mobile communication devices lack the user-friendly input interfaces typically associated with a desktop computer (i.e., a full size keyboard). Accordingly, many mobile users that desire to track packages need to enter tracking numbers comprising many characters (i.e., 18 digits) while using an interface that is cumbersome each time they want to check on the status of a package. Accordingly, a need exists for systems and methods that allow a user to track packages throughout the course of delivery and which allow the user to use one or more communication devices without requiring the user to reenter a tracking number each time.

SUMMARY OF THE INVENTION

The present invention provides systems and methods that allow a user to track packages throughout the course of delivery without requiring the user to completely reenter tracking information such as an 18 character tracking number. In one embodiment of the present invention, a web user may enter a tracking number(s) for a package(s) on a web site (which has a friendly user interface and may often be accessed by a device with a standard keyboard such as a desktop computer) and later track the package without having to enter the entire tracking number (termed "retracking").

For instance, the tracking number may be entered by a user using one communication device yet tracked again without entering the entire tracking number on a second communication device. In an alternative embodiment, a delivery company or other entity may directly associate the tracking number with the user or the user's pool of communication devices. Thereafter, a user may track a package throughout the delivery process using one or more communication devices without ever entering a complete tracking number.

In an embodiment of the present invention, the user may retrack a package from the web site using the Internet and a standard personal computer or he may retrack the package using a wide variety of mobile devices that may be connected to the web site using wireless communication mediums. Alternatively, the mobile communication devices may be connected to other tracking information sources that may be designed for his communication device or that may be only secondarily interfaced with the web site.

An important aspect of the present invention is allowing the user to use a wide variety of communication devices to initially track and retrack a package. Any one of a variety of these devices may be used to initially enter a tracking number. However, some of these devices may be more preferable for initially entering a tracking number because of their friendlier and easier to use input interfaces i.e., standard full size keyboards. Additionally, any one of the variety of communication devices may then be used to retrack a package without requiring the user to enter the entire tracking number if the tracking number was entered by any communication device associated with that user. Instead, a short message or a few keystrokes etc. may be sent to indicate a particular tracking number. Tracking numbers may also be associated with a user by a third party such as the package delivery company or shipper of the package so that the user may never have to enter the entire tracking number.

A preferred embodiment of the present invention is a method for tracking packages which includes the steps of allowing a user to enter into a tracking system at least one tracking number for tracking packages using a first communication device, associating the at least one tracking number with the user, and allowing the user to track packages associated with the at least one tracking number using a second communication device without requiring the user to reenter into the tracking system the at least one tracking number.

In one preferred embodiment, the step of associating the at least one tracking number with the user is accomplished by associating the at least one tracking number with some form of identification string ("ID") associated with the user. In another preferred embodiment, the step of associating the at least one tracking number with the user is accomplished by associating the at least one tracking number with the first communication device and the second communication device.

The step of allowing a customer to enter at least one tracking number may be accomplished in a variety of different embodiments by allowing a customer to enter at least one tracking number using a variety of different communication devices of varying types including a computer keyboard, a wireless device, a wireless application protocol based device, a web enabled handheld device, a handheld markup language based device, a hyper-text markup language based Internet device, a one-way short message service device, a two-way short message service device and a web markup language based device. In some preferred embodiments the communication device used for entering the tracking number is of a different type of communication device than the communication device used for tracking the package. For example, the tracking number may be entered with a desktop computer connected to an Internet site while the package is later tracked using this entered tracking number using a cell phone. In other embodiments, the same type of communication devices or the exact same device are used for both entering tracking numbers and tracking packages.

The step of allowing the customer to track the at least one tracking number using a second communication device may be accomplished in a variety of different embodiments by using a variety of different types of communication devices which include a computer keyboard, a wireless device, a wireless application protocol based device, a web enabled handheld device, a handheld markup language based device, a hyper-text markup language based Internet device, a one-way short message service device, a two-way short message service device and a web markup language based device.

Another preferred embodiment of the present invention is a method for tracking packages which includes the steps of allowing a user to enter into a tracking system at least one tracking number for tracking packages using a communication device, associating the at least one tracking number with the user, and allowing the user to track packages associated with the at least one tracking number using the same communication device without requiring the user to reenter into the tracking system the at least one tracking number.

Yet another preferred embodiment of the present invention is a method for tracking packages which includes the steps of associating at least one tracking number with a user and allowing the user to track packages associated with the at least one tracking number using a wireless communication device without requiring the user to enter the at least one tracking number.

Yet another preferred embodiment of the present invention is a method for tracking packages which includes the steps of associating at least one tracking number with a user and allowing the user to track packages associated with the at least one tracking number using more than one communication device without requiring the user to enter the at least one tracking number into a tracking system.

Another preferred embodiment of the present invention is a system that enables users to track packages and which includes a processor, a storage device in communication with the processor via a system bus and a memory connected to the processor, the memory including an operating system for storing a program to control the operation of the processor. The processor is operative to: allow a user to enter into a tracking system at least one tracking number for tracking packages using a first communication device, associate the at least one tracking number with the user and allow the user to track packages associated with the at least one tracking number using a second communication device without requiring the user to reenter into the tracking system the at least one tracking number.

Another preferred embodiment of the present invention is computer-readable storage medium encoded with processing instructions for implementing a method for tracking packages, said processing instructions directing a computer to perform the steps of: allowing a user to enter into a tracking system at least one tracking number for tracking packages using a first communication device, associating the at least one tracking number with the user, and allowing the user to track packages associated with the at least one tracking number using a second communication device without requiring the user to reenter into the tracking system the at least one tracking number.

There are of course many other embodiments of the present invention that provide systems and methods for allowing a user to track packages throughout the course of delivery without requiring the user to completely reenter tracking information such as an 18 character tracking number and that also allow the user to use a wide variety of communication devices to track and retrack a package without requiring reentering the entire tracking number.

BRIEF DESCRIPTION OF THE DRAWINGS

Figure 1:
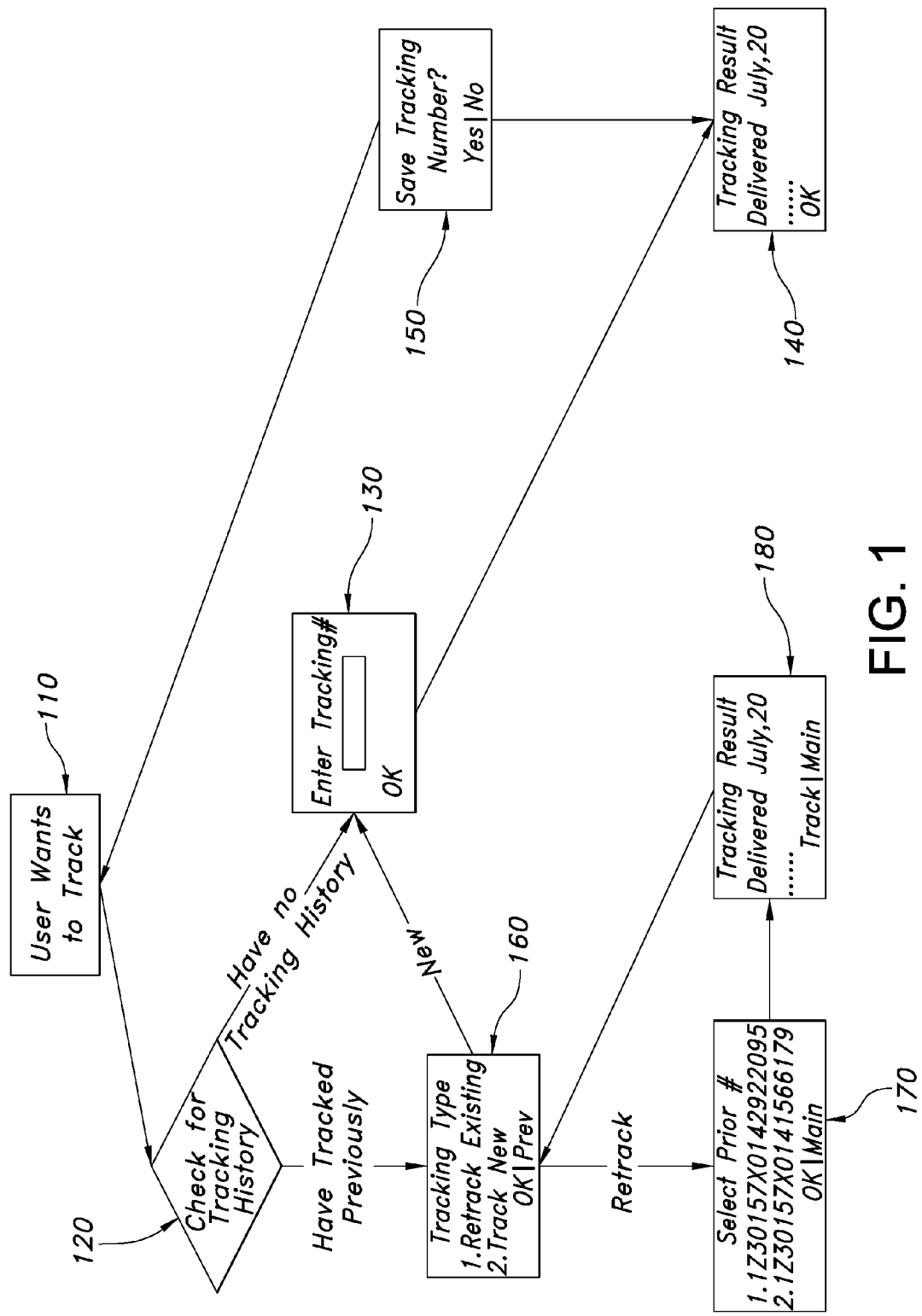

Having thus described the invention in general terms, reference will now be made to the accompanying drawings, which are not necessarily drawn to scale, and wherein:

FIG. 1 is a block diagram illustrating a method according to one embodiment of the present invention that allows a user to track or retrack a previously tracked package without having to reenter the tracking number.

Figure 2:
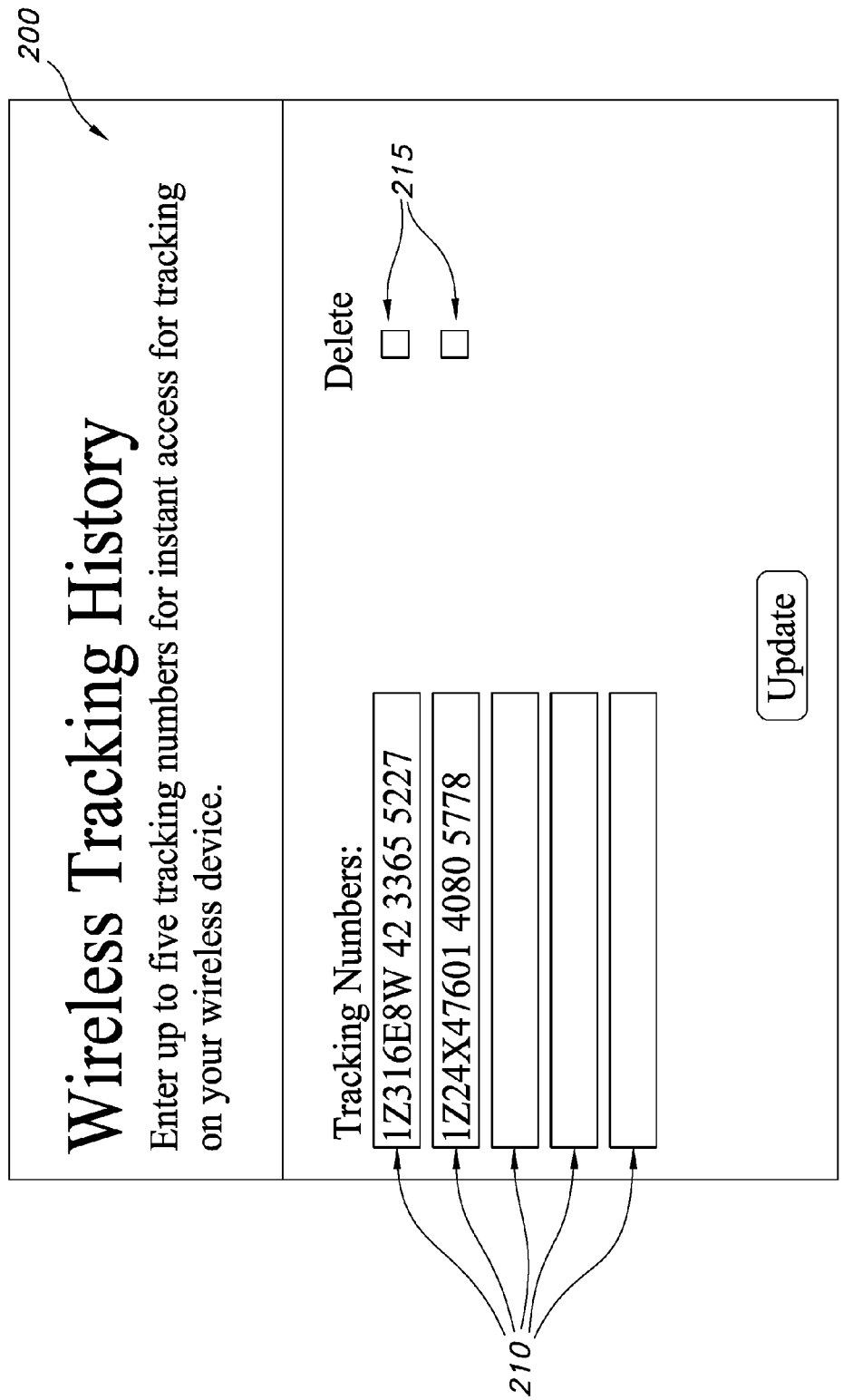

FIG. 2 illustrates a web page that may be used by a user to enter one or more tracking numbers that may be used by one or more communication devices for tracking packages in accordance with an embodiment of the present invention.

Figure 3:
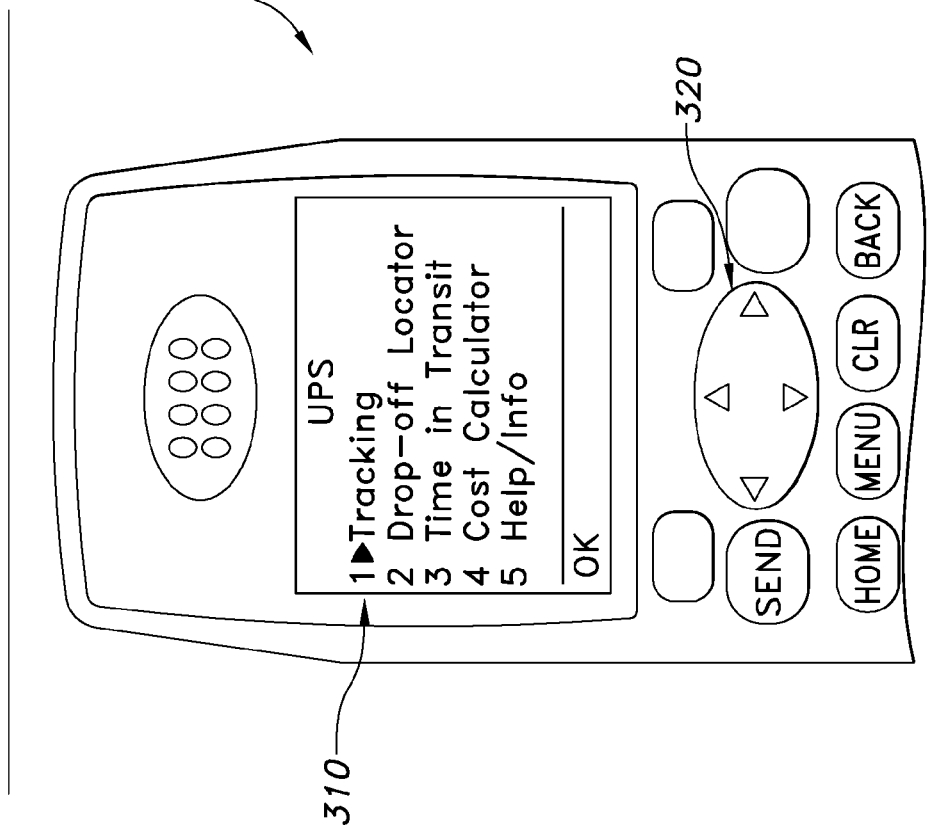

FIG. 3 illustrates a sample screen for a wireless web browser device that allows a user to choose the desired function in accordance with an embodiment of the present invention.

Figure 4:
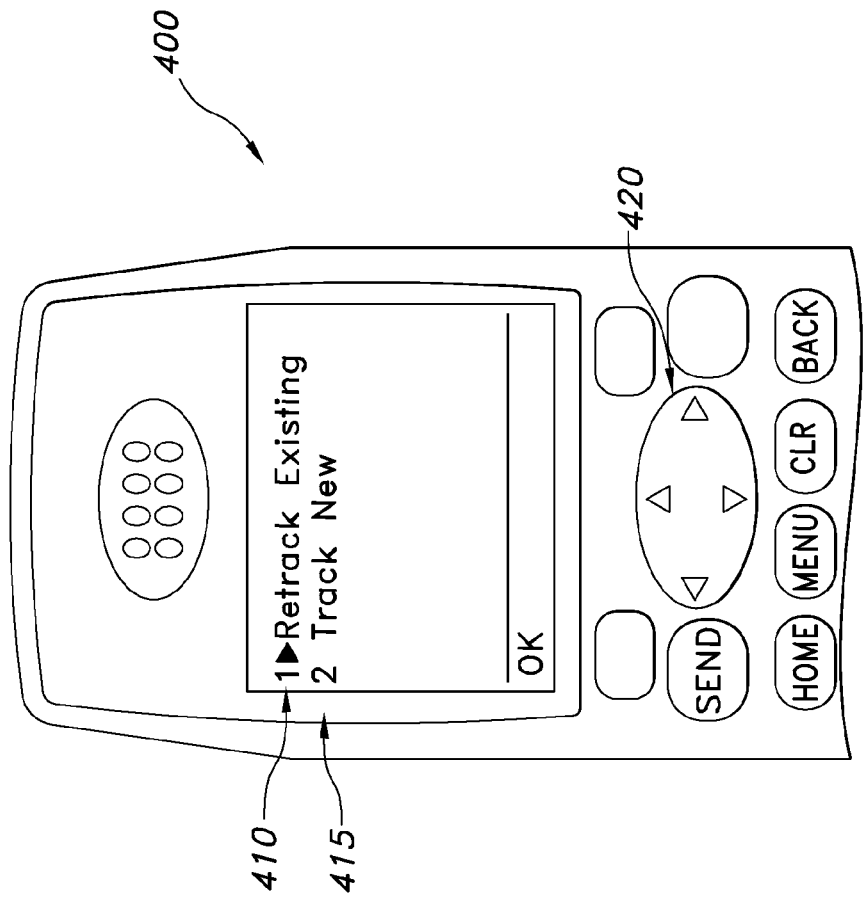

FIG. 4 illustrates a sample screen for a wireless web browser device that allows the user to choose whether they want to track a previously untracked (new) package or whether they want to retrack a package in accordance with an embodiment of the present invention.

Figure 5:
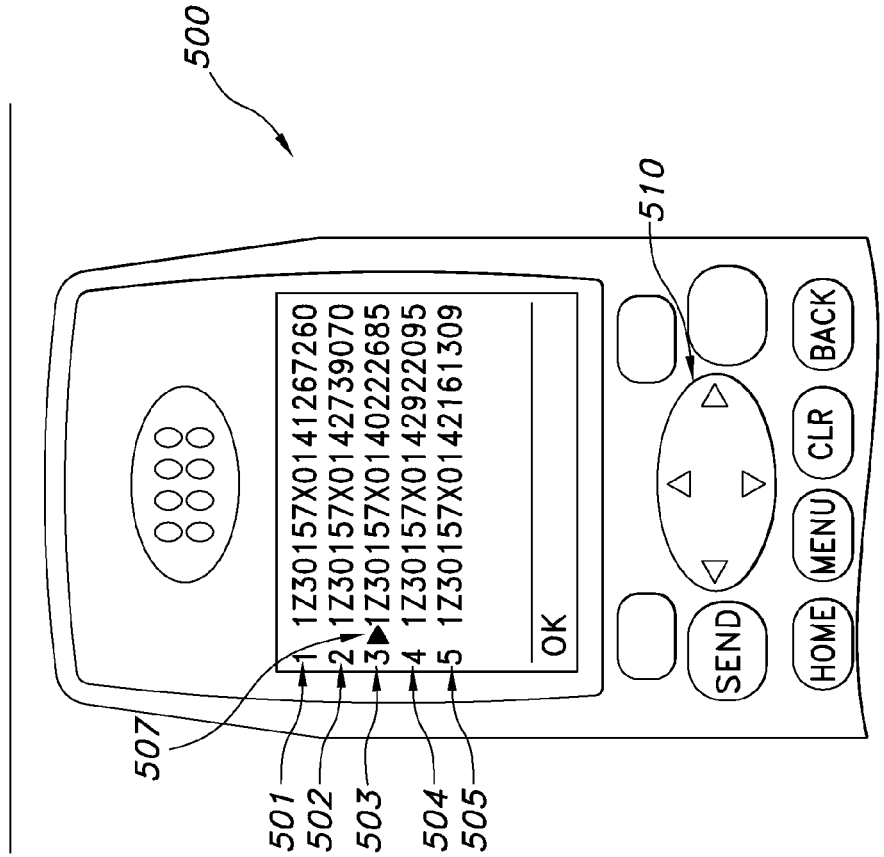

FIG. 5 illustrates a sample screen for a wireless web browser device that lists the tracking numbers in the history file of previously tracked packages so that a user may scroll down the listing and select the desired package to retrack in accordance with an embodiment of the present invention.

Figure 6:
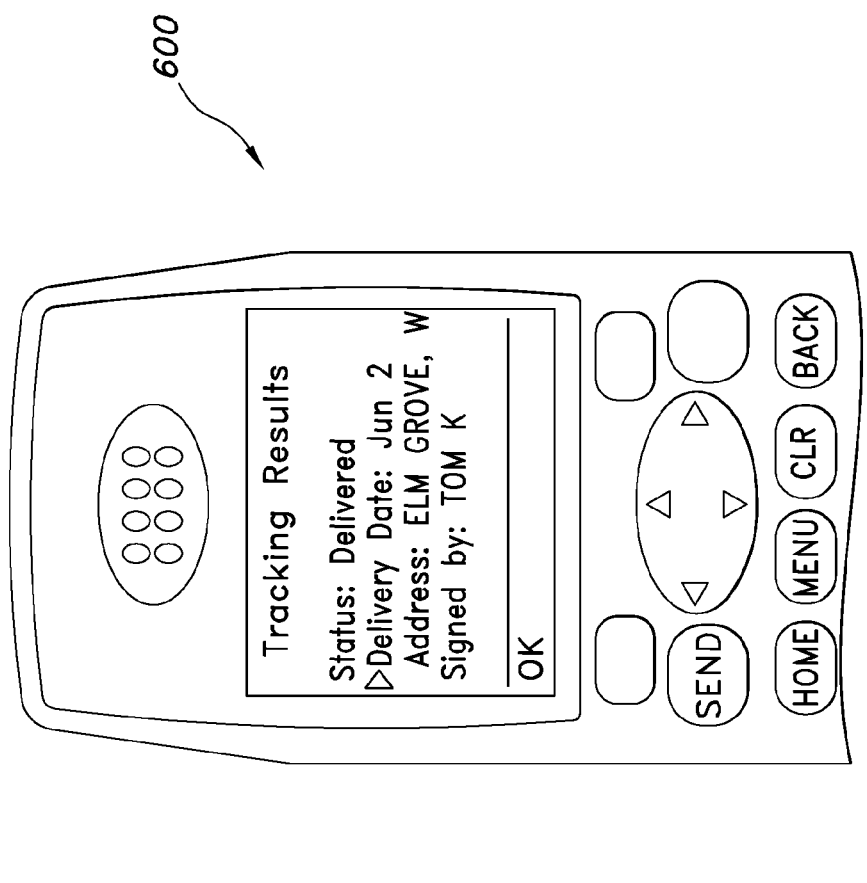

FIG. 6 illustrates a sample screen for a wireless web browser device that displays the results of the tracking or retracking of a desired package in accordance with an embodiment of the present invention.

Figure 7:
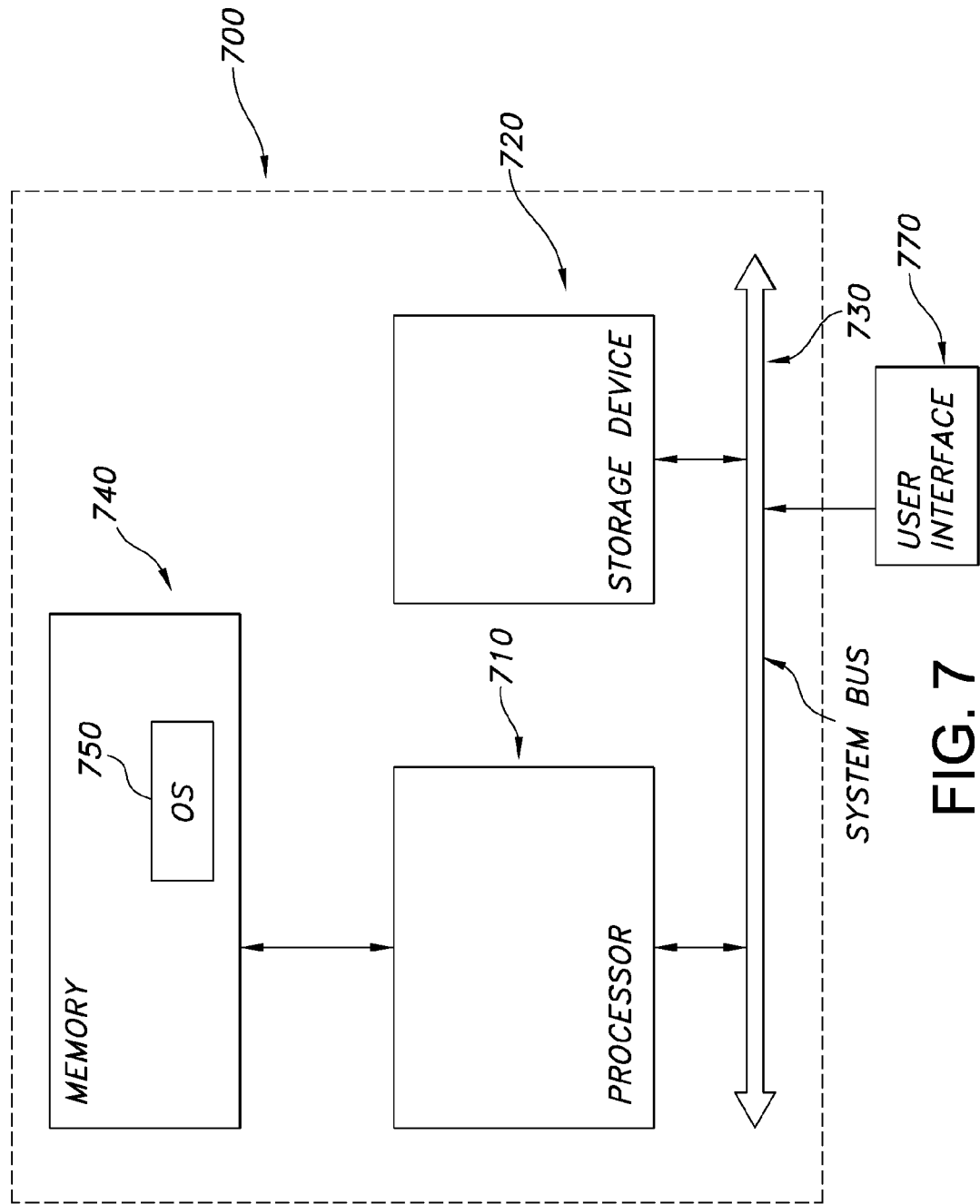

FIG. 7 illustrates a system of an embodiment of the present invention that enables users to track packages using one or more communication devices without requiring the users reenter an entire tracking number.

DETAILED DESCRIPTION OF THE INVENTION

The present invention now will be described more fully hereinafter with reference to preferred embodiments of the invention. This invention may, however, be embodied in many different forms and should not be construed as limited to the embodiments set forth herein; rather, these embodiments are provided so that this disclosure will be thorough and complete, and will fully convey the scope of the invention to those skilled in the art.

Embodiments of the present invention provide systems and methods that allow a user (i.e. customer of a package company's delivery tracking system) to track packages throughout the course of delivery using the same or one or more different communication devices without having to reenter the entire tracking number. Alternative embodiments of the present invention allow a delivery company or other interested entity such as the shipper of the package to associate the tracking number for the package directly with the user or alternatively with his pool of communication devices so that a user may track packages using one or more communication devices without ever having to indicate the full tracking number.

Currently, package delivery companies often provide web sites whereby users connect to the Internet and access a web site to seek a wide variety of information such as the delivery status of a package. Determining the delivery status of a package is often termed "tracking." A customer may track a package using the Internet by accessing the web site and entering, on the appropriate web page, a character/number string often termed a "tracking number" that is associated with the package. Tracking numbers are often rather lengthy, such as 18 characters, however, tracking numbers may be of different lengths or have a variety of alphanumeric properties in differing embodiments of the present invention.

A specific embodiment of the present invention allows a user to enter one or more tracking numbers for determining the location of one or more packages (each number being associated with an individual package) using a communication device and to retrack—the ability to track the location of a package, often previously tracked, without having to enter the entire tracking number—these packages using the same or one or more different communication devices. Responses that the customer may receive when tracking or retracking a package include whether the package has reached its final destination, who signed for the package, when a package reached a hub or other dissemination point along the way or the current status of the package.

Referring now to FIG. 1, a functional block diagram illustrating a method, according to one embodiment of the present invention, that allows a user to track or retrack a package without having to reenter the tracking number is illustrated. The process begins when a user indicates to the tracking system that he wants to determine the delivery status of a package as shown by Block 110. The tracking system can be formed in a variety of different manners which are well known to those of ordinary skill in the art and allows a user to input a tracking number and the tracking system returns a variety of delivery status information based on this inputted tracking number; it is an example of a simple query system. After the user indicates that he wants to track a package, the tracking system determines whether the user has a tracking history on the tracking system as illustrated by Block 120. A tracking history or history file is a listing of tracking numbers that have been associated with a user and may have been previously entered by the user or may have been entered by a third party such as the delivery company.

The tracking history may be associated with a user in a variety of different ways including by having the user register his communication devices with the tracking system so that when the user is using any of these devices the system recognizes the communication device (for example, by recognizing the Electronic Serial Number (ESN) or Mobile Identification Number (MIN) or Internet address or Medium Access Control (MAC) address) and recognizes that the device belongs to the user. The history may also be associated with the user by requiring the user to log into the tracking system using a user ID whenever beginning a tracking query session.

One illustrative system uses a unique customer ID wherein the customer first configures his communication devices that he wishes to use to track packages. The user may configure these devices by providing device identifying information and then this information is associated with the user by associating the device information with the user's unique customer ID. Thus, a package delivery company could track each of its customers by a unique identification number ("ID") so that if a customer enters its web site and provides his unique ID then the package delivery company can store and associate provided information with that customer. For example, if the customer provides its ID then the package delivery company can store tracking numbers that the customer has entered into the tracking web page so that the customer does not have to re-type the 18 digit numbers upon future visits to the tracking web page or upon using a configured wireless device in accordance with the present invention. Users may also add new communication devices, change PIN numbers, and remove configured communication devices through using this web page.

Alternatively, the tracking history may be associated with one or more communication devices directly so that whenever a user is using the one or more communications devices, he may access his personal tracking history without entering a user ID once the devices are identified as a pool of devices to share a user's tracking history. Multiple users may also be grouped to share a single tracking history if so desired. By associating the tracking numbers with a user in some fashion the packages may later be retracked using a variety of communication devices.

The tracking history may be saved in a preselected order such as chronologically so that users may track a particular package by its order in the list. Any entry of a tracking number could result in the tracking number being retained in the list in one embodiment. In one embodiment of the present invention, the history file only stores a certain number of tracking numbers (for example five) so that earlier numbers are displaced when many more numbers are entered i.e. if only five tracking numbers are being stored then entering a sixth number will cause the earliest saved number to be replaced with the second earliest saved number and continuing with a cascading effect so that only the five most recently tracked packages remain on the history file. An alternative embodiment of the present invention prompts the user to indicate whether they want to save the tracking number to their history file.

If the user does not have a tracking history associated with him, then the user is prompted to enter at least one tracking number as shown in Block 130. After the user has entered at least one valid tracking number, the tracking system provides the tracking results to the user's communication device as shown in Block 140. These results may also be emailed to a user if so desired. These results may contain a variety of different information depending on the current status of the delivery and the desires of the user and delivery company including location and time of delivery. The user is then prompted as to whether he desires to save this tracking number so that the tracking number will be stored in his tracking history as shown in Block 150. The user is then returned to the main menu 110 from where he first indicated his desire to track a package.

Now returning to the decision made at Block 120, if the user has a tracking history then the user is provided with a choice of whether he wants to track a package that does not have its tracking number in his tracking history (track) or track a package that does have its tracking number in his tracking history (retrack) as shown in Block 160. If the user wants to track a new package (tracking number not in his tracking history) then he is prompted to enter one or more tracking numbers as shown in Block 130. If the user chooses to retrack a package then he is provided with a listing of the tracking numbers (or some other indicia to differentiate packages or identify tracking numbers) from his tracking history as illustratively shown in Block 170. The user may then select a package to retrack from this listing by indicating which tracking number. There are many ways to accomplish this task without requiring the user to enter all of the characters in the tracking number. For instance, depending on the interface of the particular communication device, the user may indicate which package to retrack by using the keys (or other buttons etc.) on the device to scroll down the tracking history list and then pressing a key such as the "enter" key to indicate the selected (highlighted etc.) package to retrack. The tracking results will then be displayed for the selected package as shown in Block 180 without requiring the user to enter the tracking number of the package. After the tracking results have been displayed, the user may be returned to a main menu or a variety of submenus such as the menu Block 160 to track other packages.

Referring now to FIG. 2, a web page 200 that may be used by a user to enter one or more tracking numbers that may be used by one or more communication devices for retracking in accordance with an embodiment of the present invention is illustrated. The user may be provided with the tracking numbers that are currently in his history so that he may edit or delete the current entries or so that he may add new entries. The illustrative web page 200 provides five text boxes 210 for the user to enter new tracking numbers or edit existing tracking numbers from his history file; existing numbers may be displayed in the text boxes so that they may be edited or deleted. Delete check boxes 215 are provided next to each text box containing a tracking number to allow the user to indicate he wants to delete an existing tracking number. Of course, any number of text boxes may be provided depending on the desired number of tracking numbers that a user is allowed to keep in his tracking history; for explanatory purposes only retaining five tracking numbers was chosen.

A variety of communication devices may be used to track packages in accordance with present invention. FIGS. 3-6 illustrate Wireless Browser Technology. Wireless web browser devices rely on wireless web pages to prompt for input. These devices may be based on the WAP (Wireless Application Protocol) or non-WAP standards. WAP is a specification for a set of communication protocols to standardize the way that wireless devices, such as cellular telephones and radio transceivers, can be used for Internet access, including e-mail, the World Wide Web, newsgroups, and Internet Relay Chat. While Internet access has been possible in the past, different manufacturers have used different technologies. In the future, devices and service systems that use WAP will be able to interoperate. The WAP layers are (1) Wireless Application Environment (WAE), (2) Wireless Session Layer (WSL), (3) Wireless Transport Layer Security (WTLS) and (4) Wireless Transport Layer (WTP). One preferred embodiment uses WAP based Wireless web browser devices.

Referring now to FIG. 3, a sample screen 300 on a wireless web browser device that allows a user to choose the desired function (i.e. tracking as illustrated in Block 110) in accordance with an embodiment of the present invention is illustrated. The user may scroll down the menu list and select the function that he desires such as tracking 310 using the direction indicator keys of the device 320. Of course, the menu may contain a wide variety of other functions desired by the user.

FIG. 4 illustrates a sample screen 400 of a wireless web browser device that allows the user to choose whether he wants to track a package that does not have its tracking number in his tracking history (track), or track a package that does have its tracking number in his tracking history (retrack), as shown in Block 160 of FIG. 1. The user may scroll down the menu list and select the function that he desires such as retracking 410 or tracking 415 using the direction indicator keys of the device 420. Of course, the menu may also contain a wide variety of other functions desired by the user.

Referring now to FIG. 5, a sample screen 500 of a wireless web browser device that lists the tracking numbers in the history file of previously tracked packages so that the user may scroll down the listing using the direction indicator keys 510 and select the desired package to retrack, in accordance with an embodiment of the present invention, is illustrated. The sample screen 500 shows five tracking numbers (501, 502, 503, 504 and 505 respectively) in the user's tracking number history with the third tracking number 503 currently denoted for selection by the arrow indicator 507. The user may select this tracking number for tracking by pressing an enter key in which case the tracking system will return tracking results for the package associated with the third tracking number 503.

Referring now to FIG. 6, a sample screen 600 of a wireless web browser device that displays the results of the tracking or retracking of a desired package, in accordance with an embodiment of the present invention, is illustrated. The illustrative displayed result information includes the status of the delivery, the date of delivery, the delivery address and an indication of who signed for the package. Of course, any collected information may be supplied to a user if desired.

Besides the type of communication devices illustrated above, a wide variety of other wireless and traditional landline end-user communication devices are supported by the systems and methods of the present invention and may be configured by the customer including One-way Short Message Service (SMS) devices, Two-way SMS devices, Handheld Markup Language ("HDML") based devices, Web Markup Language ("WML") based devices, Palm series devices including PALM VII devices, AT&T Pocket Net, Research in Motion Ltd. ("RIM") Pagers or other web-enabled pagers, Wireless Application Protocol ("WAP") based devices and non-WAP web enabled handheld devices. A simple example of a wireless communication device that may be categorized in many of the above types of devices depending upon its designed functionality is a traditional wireless hand set i.e., a cell phone. A cell phone may be a one-way SMS device by connecting with the appropriate access number for one-way SMS devices. A cell phone may also be used both to transmit input information to a tracking system using voice or the touchpad as well as to receive voice responses from the tracking system.

Other explanatory supported devices, besides the above illustrated Wireless Web Browser Technology devices, that may be used in accordance with one embodiment of the present invention include one-way SMS devices and two-way SMS devices. As well known to one of ordinary skill in the art, one-way SMS systems provide text capabilities in one direction while two-way SMS systems have two-way text capabilities. Note, however, that the concept of the invention is not limited to one particular communication architecture or protocol but addresses the broader concept of having retracking capabilities across multiple communications devices.

One-way SMS based systems require users to call an access number and follow voice prompts to enter requests. One-way SMS tracking systems need to obtain a target phone number (the number associated with the communication device from which the user is "calling") before obtaining responses and beginning the tracking process.

A user using a one-way SMS device first dials an access number such as a toll free number or local number and follows prompts using an Interactive Voice Response ("IVR") System. If the user is not identified by caller ID, the user may be prompted to enter his telephone number and an alphanumeric security code. The user may then select package tracking from an initial menu. Users who have a tracking history may be offered the choice of re-tracking prior entries or entering a new tracking number. If entering a new tracking number, voice prompts will request the user to enter a tracking number. If the user is retracking a package he may be presented with a recited listing of the history file so that the desired package to track may be selected. Alternatively, the user may just enter the placement number of the desired package from the history file for the desired package to track if known. Newly entered tracking numbers may be validated and if the number is not valid the system may request the tracking number be entered again. When a valid tracking number has been entered the tracking system provides tracking information results.

Two-way SMS devices require users to send a message that obeys a specific format to enter requests. Two-way SMS messages often have the desired task followed by the request parameters. For package tracking the format may be "TR" concatenated with the tracking number.

For one embodiment of the present invention, the user sends a message to a specific tracking system access telephone number or other communication address. If the user wishes to enter a new tracking number, then the user must provide the message type indicator followed by the tracking number of the desired package. For example, a message type followed by tracking number may be: TR1Z316E8W4233655227. The exemplary tracking systems would attempt to remove spaces and invalid characters to find a valid tracking number, but would return an error to the two-way SMS communication device if an invalid tracking number is entered.

Alternatively, users that have a tracking history may enter the following messages for example: TR1, TR2, TR3, TR4 or TR5. The numerals represent the placement in the history file of the tracked packages. In one embodiment, the numeral "1" would represent the oldest package tracked that is still being stored while the numeral "5" would represent the most recently tracked package. Of course, many variations on this scheme exist; for instance, "1" could represent the most recently tracked package and "5" the oldest. The system would provide the user with the desired response information such as the package's status, who signed for the package, delivery status, etc. This output response may be formatted in a variety of different ways. For this embodiment, the output may be a screen display on the two-way SMS communication device.

As will be appreciated by one of ordinary skill in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. Any suitable computer readable storage medium may be utilized including hard disks, CD-ROMs, optical storage devices, or magnetic storage devices.

The present invention may be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the present invention.

These computer program instructions may also be stored in a computer-readable memory that can direct a computer or other programmable data processing apparatus to function in a particular manner, such that the instructions stored in the computer-readable memory produce an article of manufacture including instruction means which implement the present invention. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the present invention.

Referring now to FIG. 7, a computer system 700 for enabling users to track packages in accordance with an embodiment of the present invention is illustrated. The system includes a processor 710 that is communicatively connected to a storage device 720 via a system bus 730. A memory 740 is connected to the processor 710. The memory 740 includes an operating system 750 for storing a program to control the operation of the processor 710. The storage device 720 may contain such information as the tracking history for a user that can be accessed by processor 710. The processor 710 is operative to allow a user to enter into a tracking system at least one tracking number for tracking packages using a first communication device, associate the at least one tracking number with the user and allow the user to track packages associated with the at least one tracking number using the same communication device or a second communication device without requiring the user to reenter into the tracking system the at least one tracking number.

The computer system 700 of FIG. 7 may of course be combined or integrated with the delivery company's computer tracking system. Likewise, this illustrative computer system 700 may be implemented as a combination of hardware and software depending upon the desires of the entity implementing the embodiments of the present invention. Additionally, a user interface 770 may be combined with this embodiment of the present invention either directly to the system bus 730 or may be implemented to store inputted information into the memory 740 directly so that the processor 710 may perform its functions in accordance with the present invention. Thus, a user may convey tracking information directly or indirectly to the system 700 and receive tracking results directly from the system 700.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A package tracking system for providing package tracking information to a user, comprising:
   a network entity configured to store a tracking history file comprising a listing of one or more tracking numbers previously tracked by a user, the tracking history file not containing any tracking number that has not been previously tracked in association with the user; and
   a communication device operated by the user and configured to access said network entity in order to track a package corresponding to a tracking number in the tracking history file,
   wherein said network entity is further configured to:
      verify the user's identity upon the user accessing a tracking system by matching a communication device used by the user to access the tracking system with a list of communication devices associated with the user;
      access the tracking history file associated with the user, and transmit the list of one or more tracking numbers of the tracking history file to the communication device;
      receive a selection of one of the tracking numbers of the tracking history file from the communication device; and,
      transmit tracking information associated with the selected tracking number to the communication device.

2. The package tracking system of claim 1, wherein the communication device is further configured to transmit a tracking number to the network entity, and wherein the network entity is configured to accept the tracking number and to store the tracking number in the tracking history file.

3. The package tracking system of claim 1, wherein the communication device comprises a display configured to display a selectable list of previously tracked packages retrieved from the tracking history file.

4. The package tracking system of claim 1, wherein the communication device comprises a wireless communication device.

5. The package tracking system of claim 1, wherein the communication device has a limited input functionality.

6. The package tracking system of claim 1, wherein the network entity is configured to transmit the tracking information associated with the selected tracking number upon receipt from the communication device of part of, but not all of, a package tracking number, where the complete package tracking number has previously been stored in the tracking history file.

7. The package tracking system of claim 1, wherein the communication device is further configured to transmit a user identifier and a password associated with the user to the network entity, such that the network entity verifies the identity of the user based at least in part on the user identifier and password received.

8. The package tracking system of claim 1 further comprising:
   a second communication device operated by the user and configured to transmit a tracking number to the network entity, wherein the network entity is further configured to accept the tracking number transmitted by the second communication device and to store the tracking number in the tracking history file.

9. The package tracking system of claim 8, wherein the communication device lacks a standard full size keyboard and the second communication device has a standard full size keyboard.

10. The package tracking system of claim 1, wherein the network entity is further configured to create a tracking history file associated with the user.

11. A network entity for providing package tracking information from a package tracking system to a user, comprising:
   a processor configured to:
      receive a request to track a package from a communication device operated by the user;
      verify the identity of the user or the identity of the communication device;
      access a tracking history file associated with the user in a computer readable memory, said tracking history file comprising a listing of one or more tracking numbers previously tracked by the user, said tracking history file not containing any tracking number that has not been previously tracked in association with the user;
      provide a list of packages based on the verifying of the identity of the user or the communication device without requiring input from the user, each package in the list corresponding to a tracking number stored in the tracking history file;
      receive a user selection of a package from the list;
      retrieve tracking information based on the tracking number corresponding to the package selected; and
      transmit the tracking information for the package selected.

12. The network entity of claim 11, wherein the processor is further configured to:
   receive a user identifier and a password associated with the user, such that in order to verify the identity of the user or the identity of the communication device operated by the user, the application is further configured, upon execution, to verify the identity based at least in part on the user identifier and password received.

13. The network entity of claim 11, wherein the processor is further configured to create the tracking history file.

14. The network entity of claim 13, wherein the processor is further configured to:
   receive a tracking number from a communication device operated by the user; and
   store the tracking number in the tracking history file.

15. The network entity of claim 14, wherein the processor is configured to receive the request to track a package from a first communication device operated by the user, and to receive the tracking number from a second communication device operated by the user.

16. A computer program product for providing package tracking information from a package tracking system to a user, wherein the computer program product comprises at least one non-transitory computer-readable storage medium having computer-readable program code portions stored therein, the computer-readable program code portions comprising:
   a first executable portion for receiving a request to track a package from a communication device operated by a user;
   a second executable portion for verifying the identity of the user or the identity of the communication device;
   a third executable portion for accessing a tracking history file associated with the user, said tracking history file comprising a listing of one or more tracking numbers previously tracked by the user, said tracking history file not containing any tracking number that has not been previously tracked in association with the user;

a fourth executable portion for providing a list of packages based on the verifying of the identity of the user or the communication device without requiring input from the user, each package in the list corresponding to a tracking number stored in the tracking history file;

a fifth executable portion for receiving a user selection of a package from the list;

a sixth executable portion for retrieving tracking information based on the tracking number corresponding to the package selected; and a seventh executable portion for transmitting the tracking information for the package selected.

17. The computer program product of claim 16, wherein the computer-readable program code portions further comprise:

an eighth executable portion for receiving a user identifier and a password associated with the user, such that the second executable portion is configured to verify the identity of the user or the identity of the communication device operated by the user based at least in part on the user identifier and password received.

18. The computer program product of claim 16, wherein the computer-readable program code portions further comprise:

an eighth executable portion for creating the tracking history file.

19. The computer program product of claim 18, wherein the computer-readable program code portions further comprise:

a ninth executable portion for receiving a tracking number from a communication device operated by the user; and a tenth executable portion for storing the tracking number in the tracking history file.

20. The computer program product of claim 19, wherein the first executable portion is configured to receive the request to track a package from a first communication device operated by the user, and the ninth executable portion is configured to receive the tracking number from a second communication device operated by the user.

* * * * *